(12) United States Patent
Gatton et al.

(10) Patent No.: US 6,733,366 B2
(45) Date of Patent: May 11, 2004

(54) TOOL AND PROCESS FOR FINISHING A VEHICLE WHEEL SURFACE

(75) Inventors: Geoffrey L. Gatton, Fort Wayne, IN (US); Richard T. Guernsey, Fort Wayne, IN (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/309,726

(22) Filed: Dec. 4, 2002

(65) Prior Publication Data

US 2003/0117008 A1 Jun. 26, 2003

Related U.S. Application Data

(62) Division of application No. 09/725,528, filed on Nov. 29, 2000, now Pat. No. 6,540,450.

(51) Int. Cl.[7] .................................................. B24B 1/00
(52) U.S. Cl. .......................... 451/28; 451/49; 451/51; 451/40; 451/487; 451/540; 407/33; 407/36; 407/42; 407/66; 407/113
(58) Field of Search ............................. 451/28, 49, 51, 451/60, 487, 540; 407/33, 36, 42, 66, 113

(56) References Cited

U.S. PATENT DOCUMENTS

| | | |
|---|---|---|
| 2,977,669 A | 4/1961 | Chambers |
| 3,289,271 A | 12/1966 | Stier |
| 3,760,660 A | 9/1973 | Van Arnam et al. |
| 4,118,846 A | 10/1978 | Korte |
| 4,189,264 A | 2/1980 | Kraemer |
| 4,835,826 A | 6/1989 | Wilson |
| 4,898,499 A | 2/1990 | Tsujimura et al. |
| 5,017,055 A | 5/1991 | Tsujimura et al. |
| 5,099,558 A | 3/1992 | Wilson |
| 5,329,684 A | 7/1994 | Budet et al. |
| 5,383,526 A | 1/1995 | Brady |
| 5,486,073 A | 1/1996 | Satran et al. |
| 5,643,055 A | 7/1997 | Linzell |
| 5,771,763 A | 6/1998 | Näslund et al. |
| 5,951,215 A | 9/1999 | Paya et al. |
| 6,065,377 A | 5/2000 | Harada et al. |
| 6,082,936 A | 7/2000 | Moriguchi et al. |
| 6,155,755 A | 12/2000 | Kanada et al. |
| 6,220,795 B1 | 4/2001 | Matthews |
| 6,241,430 B1 * | 6/2001 | Norstrom ................... 407/114 |
| 6,315,502 B1 | 11/2001 | Maurer |
| 6,609,859 B1 * | 8/2003 | Sjöö .......................... 407/103 |

FOREIGN PATENT DOCUMENTS

| | | |
|---|---|---|
| DE | 100 34 228 | 2/2001 |
| EP | 0 313 534 | 4/1989 |
| EP | 0 638 383 | 2/1995 |
| WO | 98/41360 | 9/1998 |

\* cited by examiner

Primary Examiner—Joseph J. Hail III
Assistant Examiner—Shantese McDonald
(74) Attorney, Agent, or Firm—MacMillan, Sobanski & Todd, LLC

(57) ABSTRACT

A vehicle wheel has an outboard face which includes a smoothed portion to provide a cosmetic finish to the wheel face. The smoothed portion is formed by pressing a cutting tool having a non-symmetrical tip against the wheel surface as the wheel is rotated.

20 Claims, 5 Drawing Sheets

TOOL AND PROCESS FOR FINISHING A VEHICLE WHEEL SURFACE

CROSS REFERENCE TO RELATED APPLICATIONS

This application is a Divisional Application of U.S. patent application Ser. No. 09/725,528, filed on Nov. 29, 2000.

BACKGROUND OF THE INVENTION

This invention relates in general to vehicle wheels and in particular to a vehicle wheel having an outboard face which includes a finished portion to provide a cosmetically pleasing appearance to the wheel face and a method and cutting tool for machining the finished portion of the wheel face to produce a smooth surface.

Vehicle wheels typically include an annular wheel rim and a circular wheel disc. The wheel disc can be formed across the outboard end of the wheel rim or recessed within the wheel rim. The wheel rim is adapted to carry a pneumatically inflated tire. The wheel rim has inboard and outboard tire retaining flanges formed on the ends thereof which extend in an outward radial direction to retain the tire on the wheel. Inboard and outboard tire bead seats are formed on the outer surface of the wheel rim adjacent to the corresponding tire retaining flange to support the tire wall beads and form an air-tight seal therewith. The wheel rim also includes a reduced diameter deep well between the tire bead seats to facilitate mounting the tire upon the wheel.

The wheel disc includes a central wheel hub for mounting the wheel upon a vehicle. The inboard face of the wheel disc hub is typically machined to form a flat surface to assure good contact between the wheel disc and the vehicle wheel hub. A pilot hole and a plurality of wheel stud holes extend through the wheel hub. The pilot hole is centered on the hub and the stud holes are spaced equally about a bolt hole circle which is concentric with the pilot hole. The pilot hole can receive the end of an axle while the wheel stud holes receive wheel studs for attaching the wheel to the vehicle. The wheel disc also typically includes a plurality of wheel spokes which extend radially from the wheel hub to the wheel rim and support the hub within the rim.

Referring now to the drawings, a flow chart for a wheel manufacturing process is shown in FIG. 1. In functional block 10, a wheel is cast in a single piece from a light weight metal such as aluminum, magnesium or titanium, or an alloy of a light weight metal. Such wheels are becoming increasingly popular because they weigh less than conventional steel wheels and can include outboard wheel disc faces which are formed in a pleasing aesthetic shape. One piece wheel castings are usually formed by a gravity or low pressure casting process. The wheel castings are finished by machining to a final shape.

Two separate machining stations are typically used to finish a wheel casting. In functional block 11, the outboard end of a rough wheel casting is clamped to the face of a first wheel lathe for a first set of machining operations. A wheel lathe is a dedicated machine designed to finish wheels. Wheel lathes typically include a plurality of cutting tools mounted upon a lathe turret. The turret is indexed to sequentially move each of the tools to the surface of the wheel casting. Wheel lathes are usually operated under Computer Numerical Control (CNC) to sequentially perform a number of related machining operations. For example, a wheel lathe turret can be equipped with a turning tool, a facing tool and a drill bit and the wheel lathe can be programmed to sequentially turn, face and bore a wheel casting. The wheel lathe face typically includes a chuck having a plurality of jaws which grip the outboard wheel retaining flange and tire bead seat. Consequently, the outboard wheel rim end is not finished during the first set of machining operations.

The outside and inside surfaces of the wheel rim are turned to their final shapes and the inboard surface of the wheel hub is faced in functional block 12. Additionally, the inboard end of the wheel rim is finished. The partially finished wheel casting is removed from the first wheel lathe, reversed and clamped on a second wheel lathe for a second set of machining operations in functional block 13. During the second set of machining operations, the inboard wheel flange and tire bead seat are gripped in the jaws of the wheel lathe chuck, exposing the outboard surface of the wheel disc and the outboard end of the wheel rim for machining.

In functional block 14, the second wheel lathe turns and faces the outboard wheel face. During these operations, the outboard tire retaining flange and the outboard tire bead seat also are turned to final shapes. The surface of the hubcap retention area is machined to final shape and the stud mounting holes are drilled through the hub in functional block 15. Alternately, the wheel casting may be removed from the wheel lathe and the drilling operation completed at another work station.

During the facing and other machining operations, very fine grooves are formed in the surfaces of the wheel. Accordingly, the surface of the wheel is typically subjected to a finishing step, as shown in functional block 16. A typical finishing process involves polishing the wheel surface to smooth the grooves and provide a lusterous appearance to the surface of the wheel. The polishing is usually followed by application of a clear coating to protect the polished wheel surface.

A typical polishing operation is illustrated by a flow chart in FIG. 2. Polishing typically involves a first step of rough buffing with an abrasive compound as shown in functional block 20. The buffed wheel is degreased in functional block 21. One frequently used method of degreasing involves passing the wheel through a chamber which is filled with a solvent vapor. The solvent vapor condenses upon wheel, covering the entire wheel surface. Once the solvent has had a sufficient time to dissolve any surface grease, the solvent is washed from the wheel to complete the degreasing. As shown in functional block 22, the wheel is then wet polished with a liquid lubricant for the polishing abrasive. The wheel is usually rotated and rotating polishing wheels are applied to the surface while a slurry of polishing abrasive and a carrier fluid is applied to the wheel surface. Next the wheel is rinsed in functional block 23. Typically, deionized water is used for the rinse.

The substances utilized during wheel polishing are generally toxic in nature. Accordingly, it is common practice to ship the wheels to a polishing contractor who employs safety procedures to protect personnel. The contractor is also equipped to dispose of the toxic wastes generated by the polishing operations.

The polished wheel surface is prepared for coating in functional block 24. Typically, the preparation includes immersion of the wheel in a chromate bath. Finally, a clear coating is applied to the wheel in functional block 25. Usually, the clear coating is sprayed onto the wheel while the wheel is slowly rotated. The coating is then heated in a curing oven.

SUMMARY OF THE INVENTION

This invention relates to vehicle wheel having an outboard face which includes a finished portion to provide a cosmetically pleasing appearance to the wheel face and a method and improved cutting tool for machining the finished portion of the wheel face to produce a smooth surface.

As described above, it is known to buff or polish a wheel surface. However, such processes require abrasives and solvents. Typical solvents include trichloroethylene, trichloroethane, sulfuric acid and perchloroethylene, which are toxic. Additionally, the lubricants for the abrasives can include animal lubricants such as grease and lard. The polishing wheels can produce air-borne lint during the polishing and buffing operation. Accordingly, it is necessary to protect the workers from these materials and collect and dispose of the residues. Because of the complexity of the polishing operations and the need to appropriately control the environmental impact of the materials utilized, wheels are often shipped to an outside contractor for polishing. This involves additional time and expense. Thus, it would be desirable to smooth the wheel face without polishing the wheel.

The present invention contemplates a vehicle wheel comprising an annular wheel rim portion and a wheel disc formed across the wheel rim. The wheel disc has an outboard face which includes a smoothed portion to provide a pleasing cosmetic appearance. It is further contemplated that the smoothed portion of the wheel disc face can extend over the entire surface of the wheel disc outboard face. An optional protective coating can be formed over the smoothed portion of the wheel disc face.

The present invention further includes a process for forming a decorative surface upon a vehicle wheel face which comprises providing a machined vehicle wheel including a wheel rim and having a wheel disc extending radially across the wheel rim. The machined wheel is mounted in a lathe. The wheel is rotated while an improved cutting tool having a non-symmetrical tip is urged against the outboard surface of the wheel disc to smooth a portion of the wheel disc surface. The invention also contemplates smoothing the entire outboard face of the wheel disc. Subsequent to smoothing the wheel face, an optional protective coating can be applied to the smoothed surface.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 3:
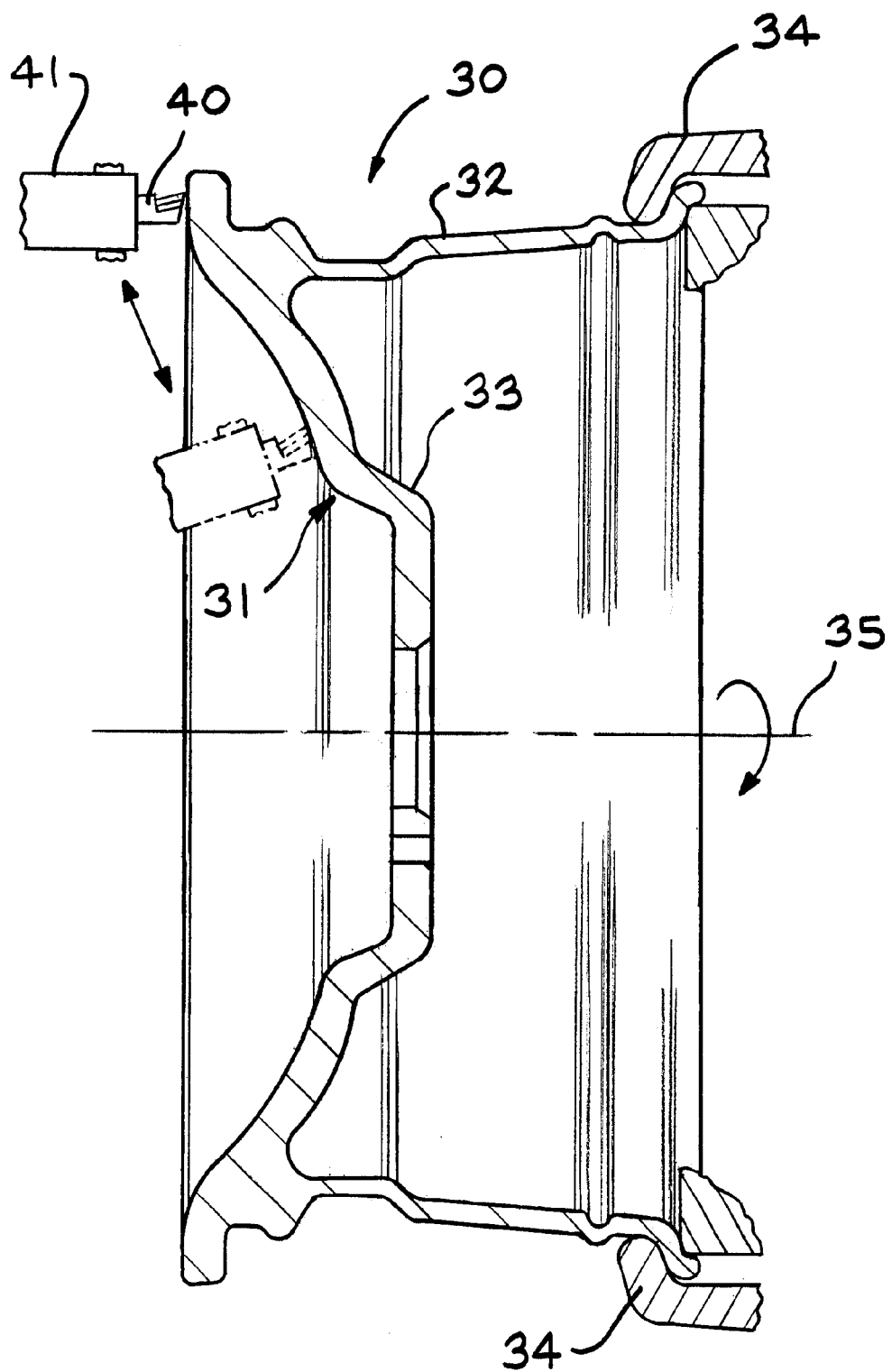
FIG. 3 is a sectional view of a vehicle wheel and illustrates a process for finishing the vehicle wheel face in accordance with the invention.

Referring again to the drawings, there is illustrated in FIG. 3, a sectional view of a one piece wheel 30 having an outboard surface 31 and a process for finishing the wheel 30 in accordance with the present invention. The finishing involves cutting the wheel surface 31 with an improved cutting tool having a unique geometry that will be described below. An increased brightness or shine of the wheel surface is expected from the cutting process. Thus, the present invention is directed to smoothing the visible portions of a wheel face to cosmetically improve the appearance of the wheel face.

As shown in FIG. 3, the wheel 30 includes an annular wheel rim 32. A wheel disc 33 which includes the outboard surface 31 extends radially across the outboard end of the wheel rim 32. The invention contemplates mounting an inboard end of the wheel rim 32 in the jaws 34 of a lathe or a spinner chuck of a wheel lathe (not shown).

The wheel 30 is rotated about an axis 35, as shown by the arrow in FIG. 3, by the wheel lathe. An improved cutting tool 40 is mounted upon a tool holder 41 that is secured to a wheel lathe turret (not shown). The wheel lathe urges the cutting tool 40 against the outboard wheel face 31 to simultaneously remove material from the wheel face 31 and smooth the cut surface. The tool 40 is traversed in a radial direction from the outboard end of the wheel rim 32 across the wheel face 31. The tool 40 moves alternately toward and away from the center of the wheel disc 33, as shown by the small arrows in FIG. 3. As the tool 40 moves across the wheel face 31, the tool 40 also is moved axially to follow the contour of the wheel face 31. The invention further contemplates that the improved cutting tool 40 can be inclined to smooth all possible inclinations of the wheel face 31, such as horizontal, vertical or inclined, as illustrated in phantom in FIG. 3. Additionally, the tool 40 can be advanced in an axial, or radial, direction to increase the amount of material removed from the wheel face 31. Liquid coolant is applied to the working surface by a conventional supply means (not shown). As will be described below, a portion of the surface of the wheel face 31 is melted and then resolidified as the tool 40 passes thereover to form a smoothed portion of the wheel face 31.

Figure 4:
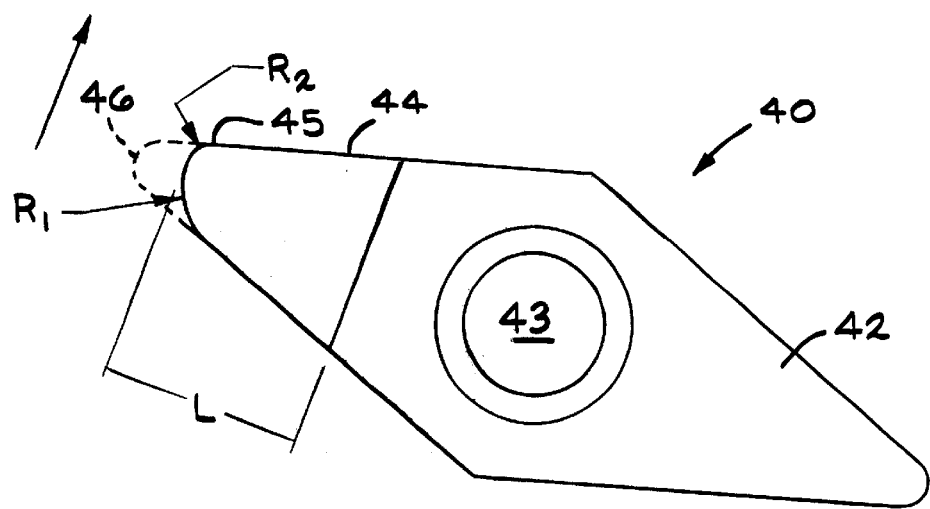
FIG. 4 is a plan view of a wheel surface finishing tool in accordance with the invention that is used in the finishing process illustrated in FIG. 3.
Figure 5:
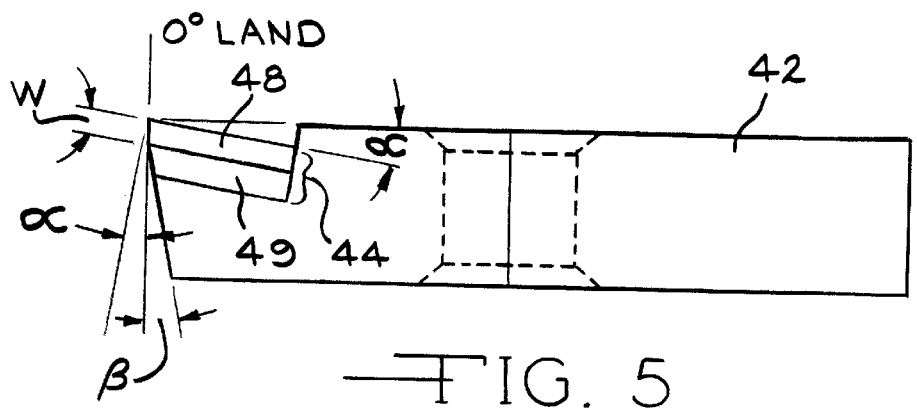
FIG. 5 is a side elevation of the surface finishing tool shown in FIG. 4.

As shown in FIGS. 4 and 5, the improved cutting tool 40 is a specially modified face cutting tool. The tool 40 has a rhombic shaped body 42 having a bore 43 formed therethrough which receives a fastener (not shown) for securing the tool to the tool holder 41. The tool 40 is formed from a sintered carbide steel and includes a Poly Crystalline Diamond (PCD) insert 44 insert attached to one end. The insert 44 includes an improved cutting tip 45 on one end that contacts the wheel face 31 and works the metal. The arrow in the upper left portion of FIG. 4 indicates the direction of movement of the worked metal relative to the cutting tool 40. The insert 44 has a length L of about six mm.

The present invention contemplates a special geometry for the cutting tip 45. For comparison, a standard cutting tip is outlined by the dashed line labeled 46 in FIG. 4. While the standard cutting tip 46 is symmetrical about the centerline of the tool, the cutting tip 45 of the improved tool 40 is non-symmetrical, having two different radii. The leading edge of the tip 45 has a larger radius $R_1$ while the trailing edge of the tip 45 has a smaller radius $R_2$. Both radii $R_1$ and $R_2$ are tangent to the centerline of the tool 40. In the preferred embodiment, the leading edge radius $R_1$ is twice the trailing edge radius $R_2$. Additionally, the leading edge radius $R_1$ is selected to be greater that the rate of feed per revolution programmed into the wheel lathe to cause multiple cutting of the wheel surface prior to the tangent point of the tip 45. In the preferred embodiment, the leading edge radius $R_1$ is 3.01 mm while the trailing edge radius $R_2$ is 1.5 mm. These radii compare to a typical standard cutting tip radius of 1.0 mm. The direction of movement of the wheel being worked is indicated by the arrow in FIG. 4.

Figure 6:
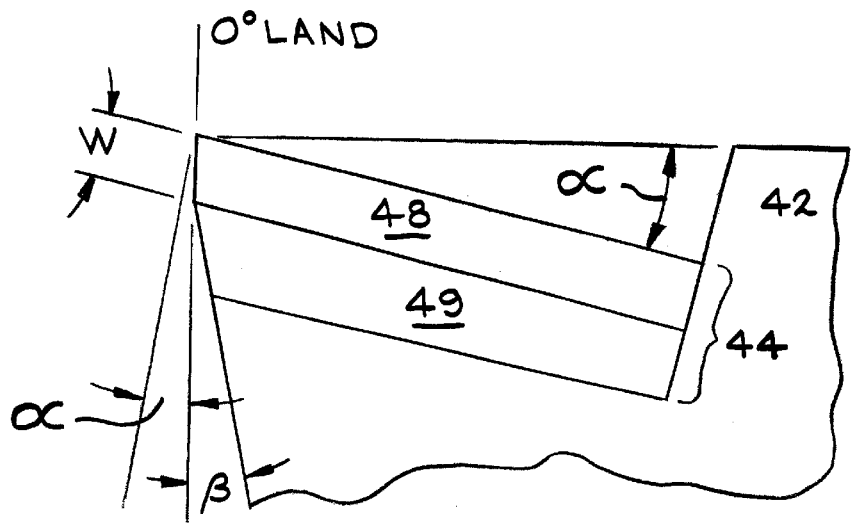
FIG. 6 is an enlarged partial side elevation of the tool shown in FIG. 5.

As best seen in FIGS. 5 and 6, the insert 44 is canted at an angle α relative to the top surface of the tool body 42. In the preferred embodiment, the angle α is seven degrees. A flat land 48 is formed around the upper edge of the insert 44. The land 48 is perpendicular, or has zero rake, to the top surface of the tool body 42. Because the insert 44 is canted relative to the tool body 42, the cutting edge of the insert 44 also forms an angle of a with the tool body top surface. Thus, the cutting edge of the insert 44 is maintained tangent to the surface of the face of the vehicle wheel. The land 48 has a width W that is in the range of between 0.076 and 0.254 mm with the preferred embodiment having a width in the range of 0.076 to 0.127 mm. The lower portion 49 of the insert 44 and the tool body 42 are undercut at an angle β to allow removal of the cut material. The angle β is in the range of five to 15 degrees and is five degrees in the preferred embodiment.

The tool holder 41 is of conventional design but is formed of an anti-vibration material, such as, for example, machinable carbide to minimize vibration by avoiding resonance. Also, the tool holder 41 is designed for a minimum extension from the wheel lathe turret to increase the rigidity of the smear cutting tool 40. Additionally, it is contemplated that the associated wheel lathe includes a balanced chuck, centering, locating and clamping mechanisms.

During operation, the zero rake land of the insert tip 44 rubs the wheel surface causing "work hardening" of the wheel metal. This differs from a process commonly referred to as "smear cutting" where a tool is dragged in a "backward" direction over the workpiece to only smooth the surface. The present invention contemplates advancing the tool 40 in a "forward" direction. The unique geometry of the improved cutting tool tip 45 simultaneously removes material from the wheel face and smooths the wheel face. The friction between the tool tip 45 and the wheel surface generates sufficient heat to cause microscopic melting of the surface metal. The friction between the tool tip 45 and the wheel surface forces a small amount of the melted metal in front of the tip 45 and into any surface voids. The melted surface metal then resolidifies. The melting and resolidification of the metal can leave a bright surface that appears to have been polished.

The inventors believe that as a wheel solidifies following casting, a layer of oxidized metal is formed upon the surface of the wheel. The oxidized layer is melted and quickly resolidifed during the cutting process with the improved cutting tool 40. As a result, an oxidized layer does not have a chance to be formed. A similar process is utilized to provide a lustrous surface finish to gold ingots. As a gold ingot solidifies, the exterior surface becomes dull due to slight oxidation of the gold on the surface and impurities rising to the surface. A torch is used to heat and remelt the surface of the ingot to a semi-liquid state. The torch is quickly removed as soon as the ingot surface becomes shiny. This process for gold ingots is typically referred to as tinning. The inventors have found that if the feedrate for the improved tool 40 is one tenth or less than the leading edge radius $R_1$, the surface appears to have been polished. The finishing process also seals any pores that could allow air to escape from a pneumatic tire mounted upon the wheel. Accordingly, the inventors expect that the number of "leakers" will be reduced.

The invention further contemplates applying a protective coating (not shown) to the wheel disc face following the work hardening process. The protective coating covers the smoothed portion of the wheel and slows the surface oxidation process. Accordingly, the inventors expect that the wheel surface will retain its shiny appearance for a long time. However, it will be appreciated that such a protective coating is optional. In the preferred embodiment, the protective coating is a clear coating; however, other coatings can be applied to the smoothed surface portion.

Figure 1:
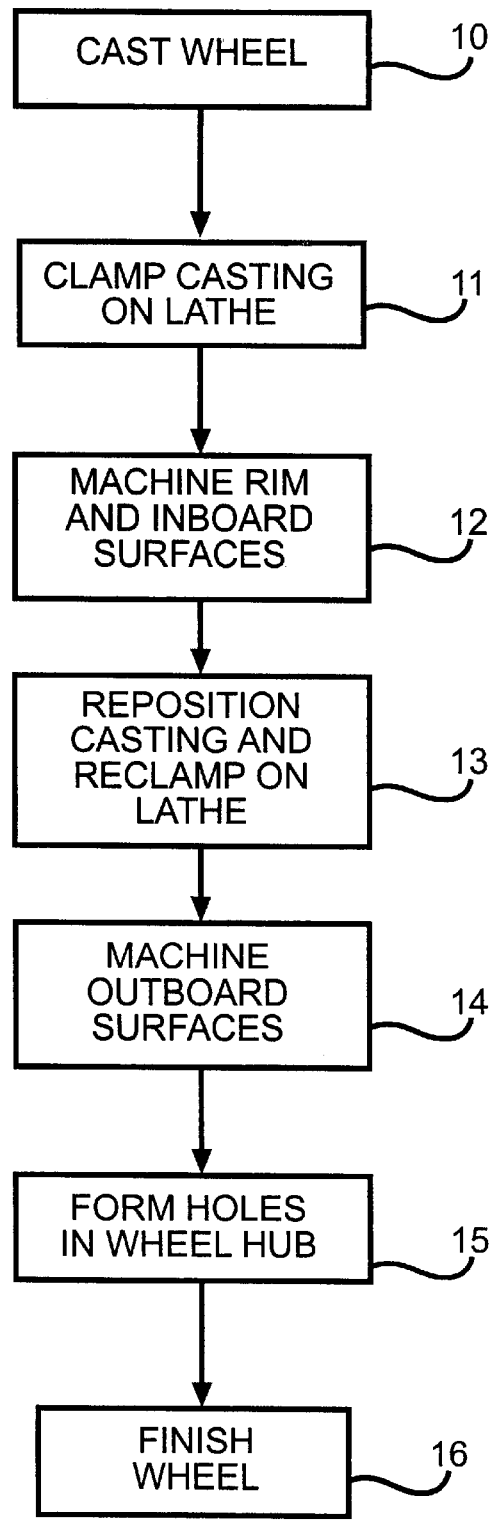
FIG. 1 is a flow chart for a known process for manufacturing a one piece vehicle wheel.
Figure 2:
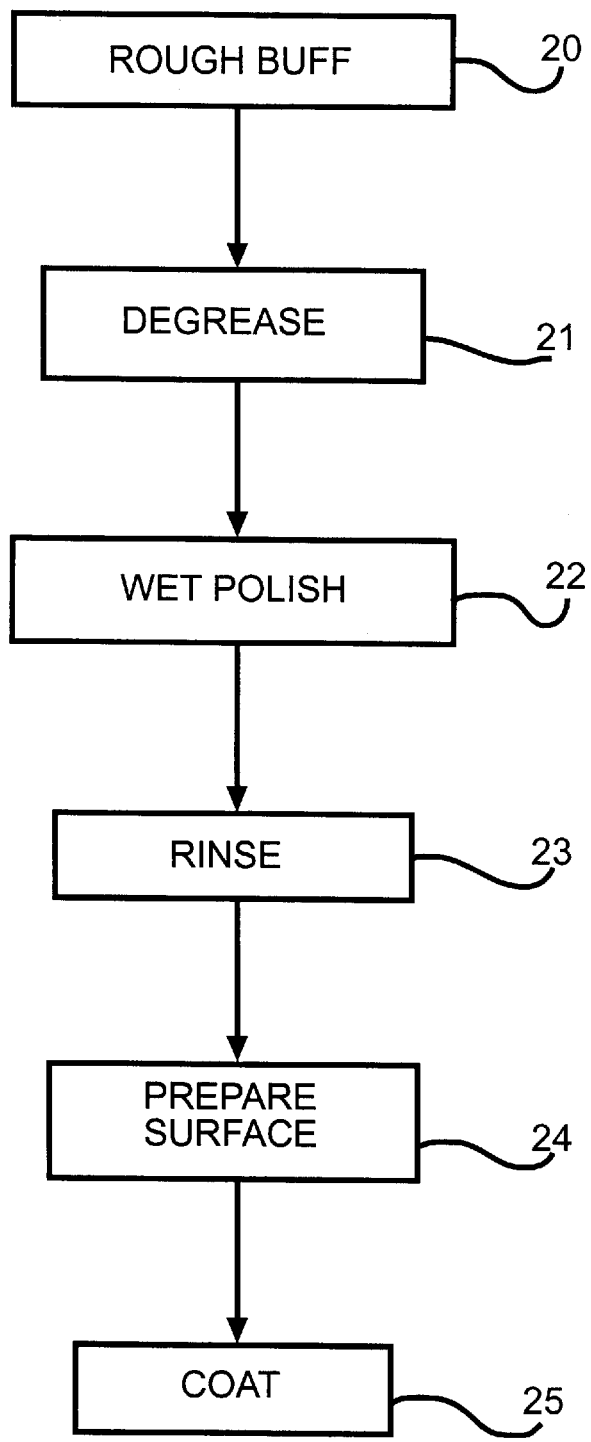
FIG. 2 is a flow chart for a known process for polishing a one piece vehicle wheel.
Figure 7:
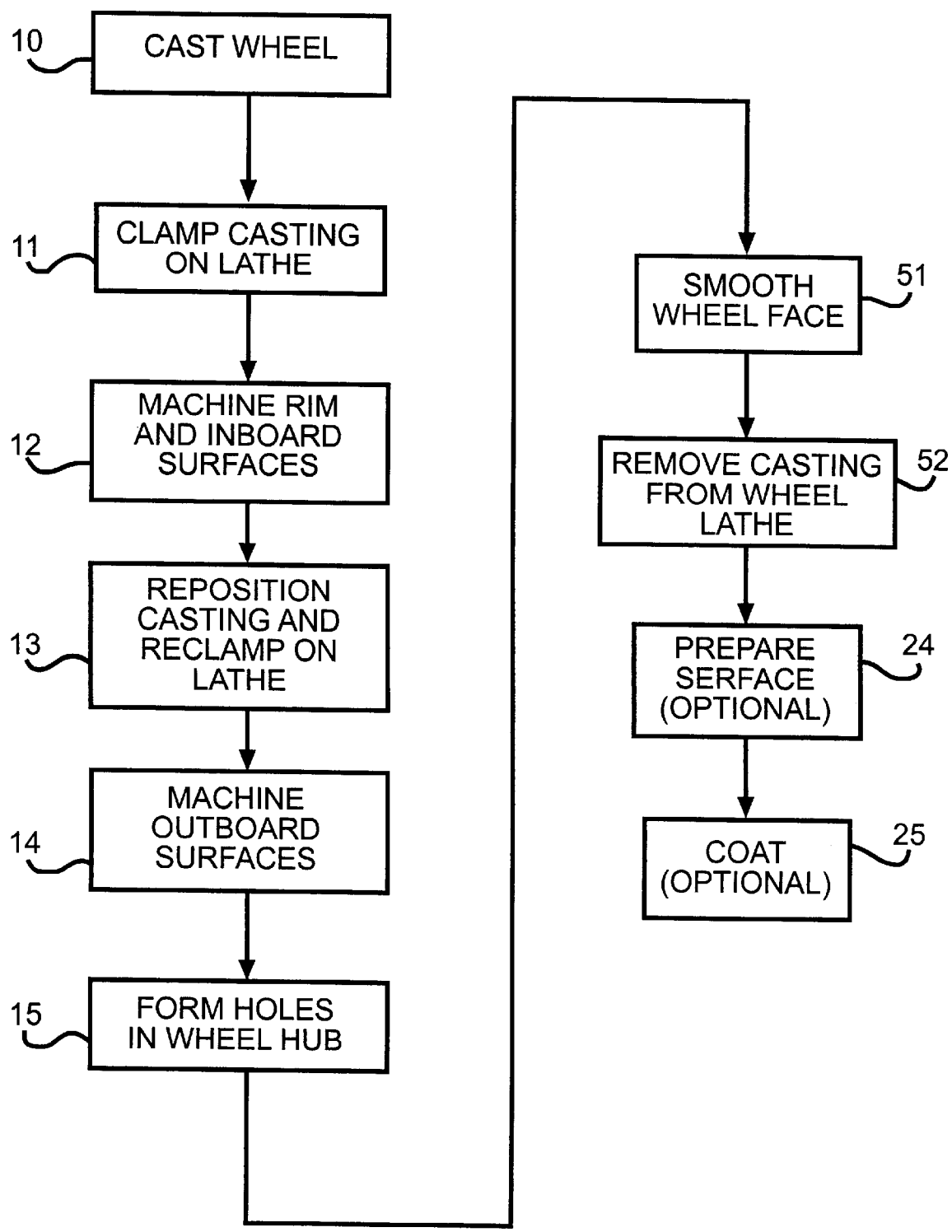
FIG. 7 is a flow chart for manufacturing a one piece vehicle wheel which utilizes the surface finishing process illustrated in FIG. 3.

The invention further contemplates a process for smoothing the wheel face that is illustrated by the flow chart shown in FIG. 7. Steps shown in FIG. 7 which are similar to steps shown in the flow charts in FIGS. 1 and 2 and have the same numerical designators. In FIG. 7, a vehicle wheel is cast by a conventional casting process, such as, for example, gravity or low pressure casting, in functional block 10. In functional blocks 11 through 15, the wheel casting is machined to a final shape as described above.

In functional block 51, the outboard wheel face is smoothed on a wheel lathe or other conventional wheel finishing machine. The wheel is rotated upon the wheel lathe while a cutting tool having the unique geometry described above is urged against and moved radially across the outboard wheel face. Once the desired surface dimensions and finish have been achieved, the wheel is removed from the wheel lathe in functional block 52.

The wheel can then be finished with a surface preparation in functional block 25 followed by a coating and curing of the coating in functional block 25. As described above, application of the protective coating to the smoothed wheel surface is optional. Thus, the present invention contemplates that smoothing is included as one of the steps in the prior art process for machining a wheel casting. For example, a cutting tool mounted upon a tool holder formed from an anti-vibration material can be added to the turret of the wheel lathe used to machine the wheel casting and the smoothing operation included as one of the programmed machining steps for finishing the wheel casting. Alternately, a smoothing station, which is dedicated to smoothing the wheel faces, can be established at the wheel manufacturing facility.

While the preferred embodiment has been described and illustrated above as smoothing the entire outboard wheel face, it will be appreciated that only a portion of the wheel face can be smoothed. For example, the esthetic design of the wheel may require that only a portion of the wheel face is to be lustrous with the remainder remaining as machined or painted. Accordingly, only the portion which is desired to be lustrous would be smoothed. Similarly, the invention also contemplates that the entire surface of wheel can be smoothed to provide an improvement in the cosmetic appearance to the wheel. Also, while the preferred embodiment has been described as being applied to cast wheels, it will be appreciated that the cosmetic appearance of wheels formed by other conventional processes also can be improved by the present invention. For example, the present invention also contemplates smoothing the outboard surface of forged or stamped wheel discs.

The inventors expect that using the improved cutting tool to cut and smooth the wheel face to enhance the cosmetic appearance thereof will cost less than buffing or polishing of the wheel face. Also, because the wheel can be smoothed on existing wheel lathes, no capital cost for polishing machines is required. The smoothing process eliminates both the exposure of personnel to toxic substances utilized during polishing and the expense of disposing of the toxic wastes generated thereby. Production time and cost will also be reduced since the need to ship the wheel to a polishing contractor will be eliminated. The improved cutting tool can extend into the wheel rim to reach the surface of a recessed wheel disc, which can be difficult to reach with polishing wheels. The cutting and smoothing preserves crisp edge surfaces which may be aesthetically desirable. Such edges tend to be blunted or removed by the abrasive nature of the polishing process. While polishing tends to highlight surface imperfections, cutting and smoothing tends to hide such surface imperfections.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been described for a one piece vehicle wheel, it will be appreciated that the invention also can be practiced upon two piece vehicle wheels having cast full face modular wheel discs. Also, the invention can be practiced upon a wheel spider which is disposed within a wheel rim.

What is claimed is:

1. A process for forming a decorative surface upon an outboard surface of a wheel disc, the method comprising the steps of:
   (a) providing a cutting tool for smoothing a wheel surface that includes a rhombic shaped body portion having a mounting aperture formed therethrough and a non-symmetrical insert carried upon one end of the body portion, the insert having arcuate leading and trailing edges, the leading edge having a leading edge radius and the trailing edge having a trailing edge radius with the leading edge radius being greater than the trailing edge radius, the insert also having a zero degree land formed thereabout whereby the cutting edge of the insert is maintained tangent to the wheel surface;
   (b) mounting a machined vehicle wheel including a wheel rim and having a wheel disc extending radially across the wheel rim in a lathe;
   (c) rotating the wheel; and
   (d) urging the cutting tool against an outboard surface of the wheel disc and traversing the cutting tool in a radial direction across the outboard surface of the wheel disc such that the wheel disc outboard surface has a polished appearance.

2. A process according to claim 1 wherein the entire outboard face of the wheel disc is smoothed in step (d).

3. A process according to claim 1 further including, subsequent to step (d), applying a protective coating to the smoothed surface.

4. A process according to claim 3 wherein the coating is a clear coating.

5. A process according to claim 1 wherein step (d) includes a rate of feed for the wheel lathe that is less than the leading edge radius of the cutting tool.

6. A process according to claim 5 wherein step (d) includes a rate of feed for the wheel lathe that is one tenth of the leading edge radius of the cutting tool.

7. A process according to claim 5 wherein step (d) includes a rate of feed for the wheel lathe that is less than one tenth of the leading edge radius of the cutting tool.

8. A process according to claim 1 wherein said cutting tool insert is formed from a hard substance.

9. A process according to claim 8 wherein the working tip is an insert formed from a polycrystalline diamond material.

10. A process according to claim 8 wherein the cutting tool leading edge radius is twice the trailing edge radius.

11. A process according to claim 10 wherein the cutting tool leading edge radius is about three mm and said trailing edge radius is about 1.5 mm.

12. A process according to claim 10 wherein the end of the cutting tool body adjacent to the tip is undercut by an angle in the range of 5 to 15 degrees.

13. A process according to claim 12 wherein the cutting tool undercut is 5 degrees.

14. A process according to claim 12 further including a tool holder formed from an anti-vibration material.

15. A process according to claim 12 wherein the cutting tool insert is canted relative to a surface of the cutting tool body.

16. A process according to claim 1 wherein the cutting tool leading edge radius is twice the trailing edge radius.

17. A process according to claim 16 wherein the end of the cutting tool body adjacent to the tip is undercut by an angle in the range of 5 to 15 degrees.

18. A process according to claim 17 wherein the cutting tool insert is canted relative to a surface of the cutting tool body.

19. A process according to claim 18 wherein said cutting tool insert is formed from a hard substance.

20. A process according to claim 19 wherein the cutting tool leading edge radius is about three mm and said trailing edge radius is about 1.5 mm.

* * * * *